UNITED STATES PATENT OFFICE.

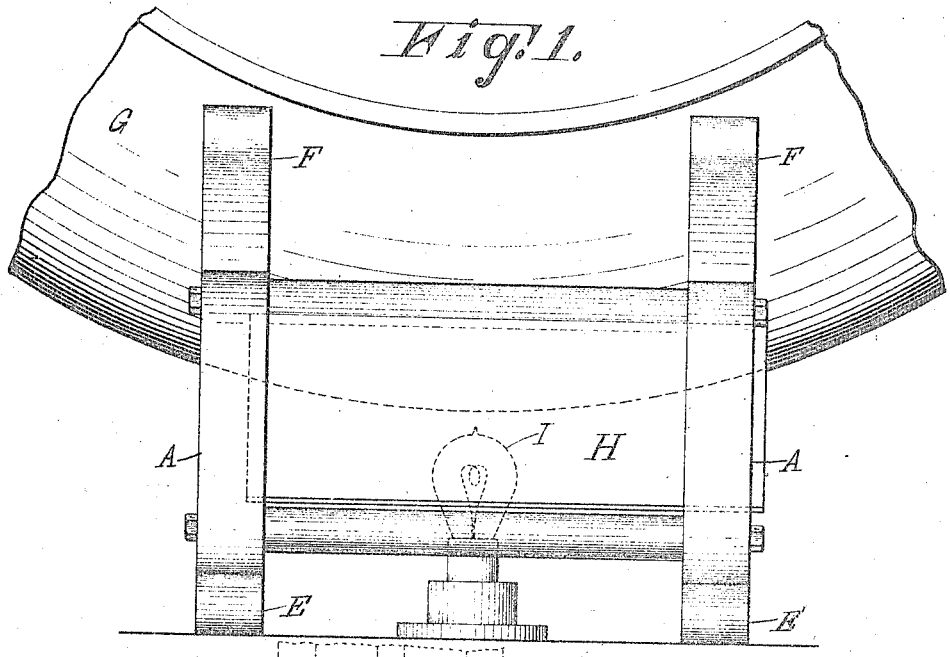
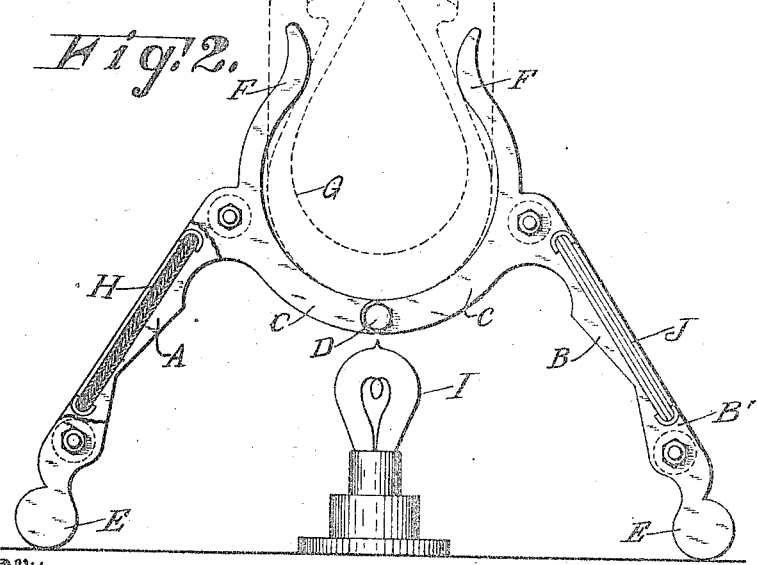

EVERETT M. DOUGHERTY, OF MILWAUKEE, WISCONSIN, ASSIGNOR TO E. J. WEAVER AND H. M. UEBELE, BOTH OF MILWAUKEE, WISCONSIN.

HOLDER FOR TIRE-CASINGS, &c.

1,264,286.  Specification of Letters Patent.  Patented Apr. 30, 1918.

Application filed January 31, 1916. Serial No. 75,258.

*To all whom it may concern:*

Be it known that I, EVERETT M. DOUGHERTY, a citizen of the United States, residing at Milwaukee, county of Milwaukee and State of Wisconsin, have invented new and useful Improvements in Holders for Tire-Casings, &c., of which the following is a specification.

My invention relates to improvements in holders for tire casings and other annular articles.

The object of my invention is to provide a form of support adapted to hold the tire casing in a raised upright position for display or storage purposes and in which the weight of the tire casing or other objects to be supported will automatically cause the support to clamp rigidly upon the supported article. My invention contemplates, however, a form of structure from which the supported article may be removed by merely lifting it away from the support, the clamping members being adapted to release the article as soon as relieved of its load.

In the drawings—

Figure 1 is a perspective view of a support for tire casings embodying my invention.

Fig. 2 is an end view of the same, showing one of the display panels in vertical section.

Like parts are identified by the same reference characters in both views.

A pair of frames A and B are each provided with an inwardly projecting arm C, these arms being pivoted together along a longitudinal axis by pivot pins or rods D. The arms are preferably rectangular in form and are provided with downwardly projecting feet E, whereby they may be supported from the floor. Each frame is preferably rectangular in form with a foot piece E at each end. Each frame is also provided with an arm C and an upwardly projecting arm F near each end. The arms C are substantially horizontal when the frame is in an upright position. The upwardly extending arms F are bowed or otherwise shaped to fit the contour of the object to be supported.

From the foregoing description it will be obvious that when the frames A and B are connected together by the pivot pins or bolts D, the resulting structure will have four supporting feet E and the lower portions of the frame may be swung convergingly or divergingly with reference to each other upon the hinge connection formed by the pivot pins D. When the feet E on the respective frames separate, the arms F will of course correspondingly converge, and when a tire casing, such as the casing G, is placed between the arms F, its weight will be exerted upon the inwardly projecting connecting arms C, thereby pushing such arms downwardly. This tends to cause the feet E to move outwardly while arms F move inwardly to clamping position at the sides of the casing.

In the construction shown, the arms F are arranged in pairs with one pair at each end of the support, the two arms of each pair being supported from the respective frames. Therefore when an annular object is placed between these arms, it will curve downwardly in the space between the connected pairs of arms C and the supported object cannot tip laterally without first spreading the arms F. But the downward pressure of the object G will be greater upon the arm C than the lateral tipping pressure exerted upon the arms F and the clamping pressure will therefore be sufficient to hold the tire casing or other object in the vertical position in which it is illustrated in the drawings. The stability with which the object is supported may of course be increased or diminished by increasing or diminishing the length of the frames A and B and correspondingly increasing or diminishing the distance between the pairs of clamping arms F.

The space between the frame bars of the frames A and B may, if desired, be occupied by suitable panels H, which may contain advertising matter. These panels may be transparent or translucent and may be illuminated by a lamp I located between the frames. One of the frame bars B' may, if desired, be slotted, as shown at J in Fig. 2 and the other frame bars may be suitably grooved to receive the margins of a panel adapted to slide through the slot J to the position in which the panel is illustrated in Fig. 1. I do not limit the scope of my invention, however, to the use of advertising panels nor to the details of construction, whereby such panels may be supported from the frames. The specific contour of the frames is also nonessential.

I claim—

A support of the class described comprising pairs of opposing legs, each leg being provided with an inwardly extending rigid arm pivoted to the similar arm of the opposing leg and a normally upwardly extending clamping arm, said arms being formed to embrace the sides of the annulus to be supported, and, arranged to utilize the weight of the annulus upon the inwardly extending rigid arms to spread the lower ends of the legs and close the clamping arms to develop a clamping pressure against the sides of the annulus and hold the same in an upright position, and means to connect the pairs of legs for mutual support.

In testimony whereof I affix my signature in the presence of two witnesses.

EVERETT M. DOUGHERTY.

Witnesses:
LEVERETT C. WHEELER,
IRMA D. BREMER.